(12) United States Patent
Saito

(10) Patent No.: US 7,380,850 B2
(45) Date of Patent: Jun. 3, 2008

(54) HOLDING STRUCTURE FOR HOLDING AN OBJECT

(75) Inventor: Masamichi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 10/845,207

(22) Filed: May 14, 2004

(65) Prior Publication Data

US 2004/0231145 A1 Nov. 25, 2004

(30) Foreign Application Priority Data

May 23, 2003 (JP) .............................. 2000-145839

(51) Int. Cl.
*B25B 1/00* (2006.01)

(52) U.S. Cl. ..................... 294/104; 294/106; 294/64.2; 294/907; 29/721; 29/744; 901/36; 414/941

(58) Field of Classification Search .......... 29/719–721, 29/729, 739, 740–744; 269/34, 218, 71, 269/253; 294/119.2, 88, 64.1, 104, 119.1, 294/902, 86.4, 106, 119.3, 907; 414/741, 414/737, 791, 730, 936, 941; 901/17, 36, 901/38, 30, 31, 35, 39, 46
See application file for complete search history.

(56) References Cited

U.S. PATENT DOCUMENTS

| 4,336,926 A | * | 6/1982 | Inagaki et al. ................. 269/34 |
| 4,351,553 A | * | 9/1982 | Rovetta et al. ............. 294/106 |
| 4,715,637 A | * | 12/1987 | Hosoda et al. ............. 294/86.4 |
| 4,900,078 A | * | 2/1990 | Bloch ......................... 294/86.4 |
| 4,957,320 A | * | 9/1990 | Ulrich ......................... 294/106 |
| 5,108,140 A | * | 4/1992 | Bartholet .................... 294/106 |
| 5,437,490 A | * | 8/1995 | Mimura et al. ............. 294/106 |
| 5,647,723 A | * | 7/1997 | Rush .......................... 414/735 |
| 5,975,604 A | * | 11/1999 | Wolin et al. .................. 294/88 |
| 6,393,694 B2 | * | 5/2002 | Roovers ....................... 29/740 |
| 6,918,622 B2 | * | 7/2005 | Kim et al. ................... 294/106 |

FOREIGN PATENT DOCUMENTS

| JP | 5-169387 | 9/1993 |
| JP | 2000-254884 | 9/2000 |

* cited by examiner

*Primary Examiner*—Minh Trinh
(74) *Attorney, Agent, or Firm*—Fitzpatrick, Cella, Harper & Scinto

(57) ABSTRACT

A holding structure, such as a manipulator, includes a plurality fingers. At least one of the fingers is movable such that an object can be held or released by a closing or opening motion of the movable finger. At least one contact surface of the fingers, which is capable of being brought into contact with the object, is formed by an elastic member, and at least one elastic member is adapted to reversibly change its elasticity under the control of an external supply of energy to the elastic member.

8 Claims, 4 Drawing Sheets

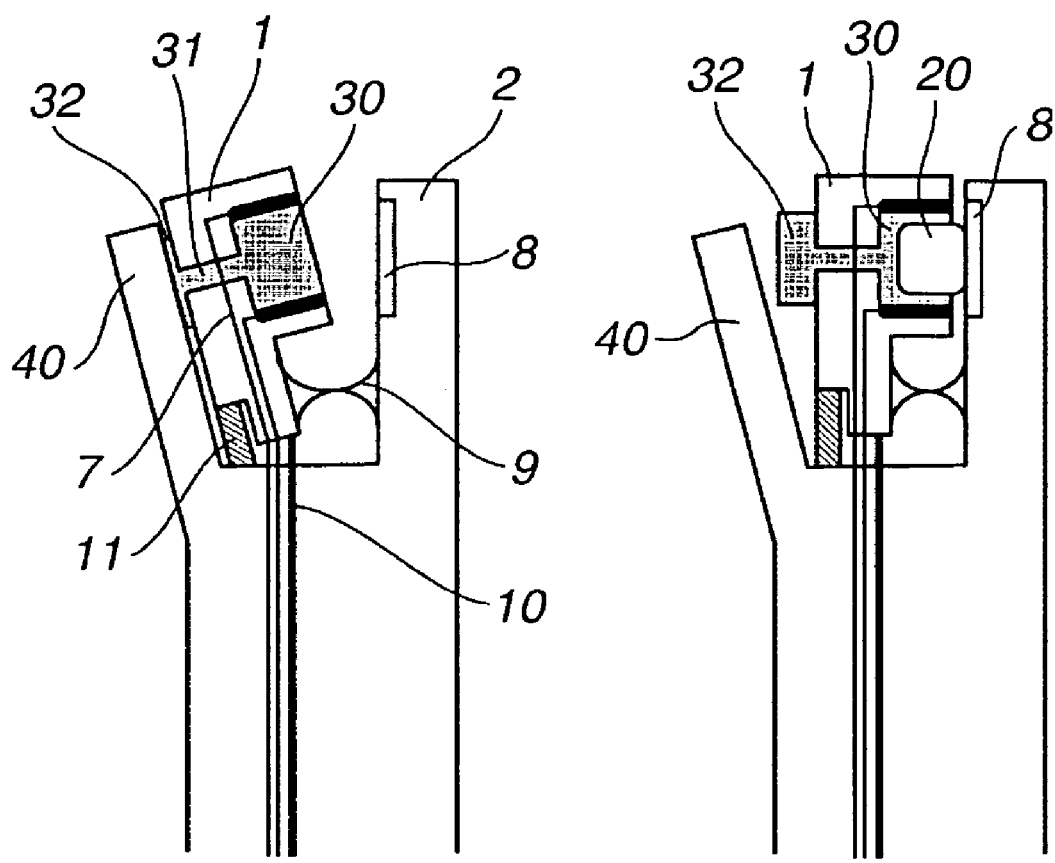

HOLDING STRUCTURE FOR HOLDING AN OBJECT

BACKGROUND OF THE INVENTION

1. Field of the Invention

The present invention relates to a holding structure for holding an object or a workpiece, which is usable in a manipulator, a robot hand, and so forth. More particularly, the present invention relates to a holding structure that is capable of accurately and certainly holding even small objects having a variety of shapes and different sizes.

2. Description of the Related Art

In recent years, downsizing and portability of products are increasingly advanced, and it becomes important to reduce the weight and the three-dimensional profile of the product. Downsizing and variety of components of products are hence increasingly advanced. Further, costs of such products are drastically decreasing, and accordingly the assemblage of components is dominantly performed by using working robots. Especially, as a life cycle of the product becomes short, it becomes important to simplify the working robot and reduce its cost.

Further, micro-machines are greatly anticipated in the future, and there is accordingly a great possibility of necessity for a method of assembling components of new sizes, sorts and profiles. Furthermore, as sizes of components decrease, rigidity and strength of the components are likely to lower. Therefore, a force for holding such components needs to be set to a small optimum magnitude. Morever, taking into a consideration the assemblage efficiency of small components for small products considering interference and the like with surroundings of the components caused when the components are assembled, the size of a holding structure for holding the components also needs to be drastically reduced.

As a hand mechanism for components, there have been conventionally proposed a gripper-type hand, and multi-joint hand mechanism. The gripper-type hand has a feature that its hand structure is simple, while the multi-joint hand mechanism is characterized by a large number of kinematic degrees of freedom for an object to be held. However, in a case of using a robot hand of the gripper type, all workpieces having various and diverse shapes cannot be stably held by a common robot hand. In contrast, in a case of using a robot hand of the multi-joint type, although all workpieces having a variety of shapes can be stably held by a common robot hand, it is difficult to identify a holding point of an object because of a large number of kinematic degrees of freedom present in the robot hand. Further, since the robot hand of this type requires a number of kinematic degrees of freedom, its structure is liable to be complicated. It is hence necessary to control a large number of actuators in a cooperative manner.

In the above-discussed situation, there have been proposed manipulating hands of a gripper type capable of stably holding a variety of objects or workpieces. Japanese Patent Application Laid-Open No. 5(1993)-169387 discloses a hand which includes a finger with a multi-core block comprised of a plurality of independently-movable cores, and in which individual cores can be moved to conform the shape of the finger to the shape of an object such that all of a variety of objects can be stably held. Further, Japanese Patent Application Laid-Open No. 2000-254884 discloses a hand in which a sensor provided in a finger senses a holding force of the finger, and the holding force is controlled by an actuator.

In the above-discussed conventional hands, however, mechanisms and control methods are likely to be complicated, and it is accordingly difficult to reduce the size of a holding structure for holding a small object or workpiece.

SUMMARY OF THE INVENTION

It is an object of the present invention to provide a holding structure which can be relatively readily constructed by making use of the feature of a holding structure, such as a gripper-type hand, that downsizing is possible, and structure and control are relatively simple, and which is capable of accurately and certainly holding even small objects having a variety of shapes and different sizes.

According to one aspect of the present invention, there is provided a holding structure, such as a manipulator, in which a plurality fingers are provided, at least one of the fingers is movable such that an object can be held or released by a closing or opening motion of the movable finger, at least one contact surface of the fingers, which is capable of being brought into contact with the object, is formed by an elastic member, and at least one elastic member is adapted to reversibly change its elasticity under the control of an external supply of energy thereto.

In the holding structure of the present invention, elasticity, which is generated due to viscosity and the like of the elastic member present at a portion for contact with an object, can be externally controlled such that the shape of the contact portion can be adjusted in conformity with the object. The holding structure is therefore capable of accurately and certainly holding even small objects having a variety of shapes and different sizes. Further, since the above external control can be relatively simply executed, the holding structure can be reduced in its size and simplified in its mechanism.

The above and other objects, features, and advantages of the invention will become more apparent from the following detailed description taken in conjunction with the accompanying drawings.

BRIEF DESCRIPTION OF THE DRAWINGS

FIGS. 4A and 4B are cross-sectional views schematically illustrating a modification of the second embodiment, respectively.

DESCRIPTION OF THE PREFERRED EMBODIMENTS

Figure 1:
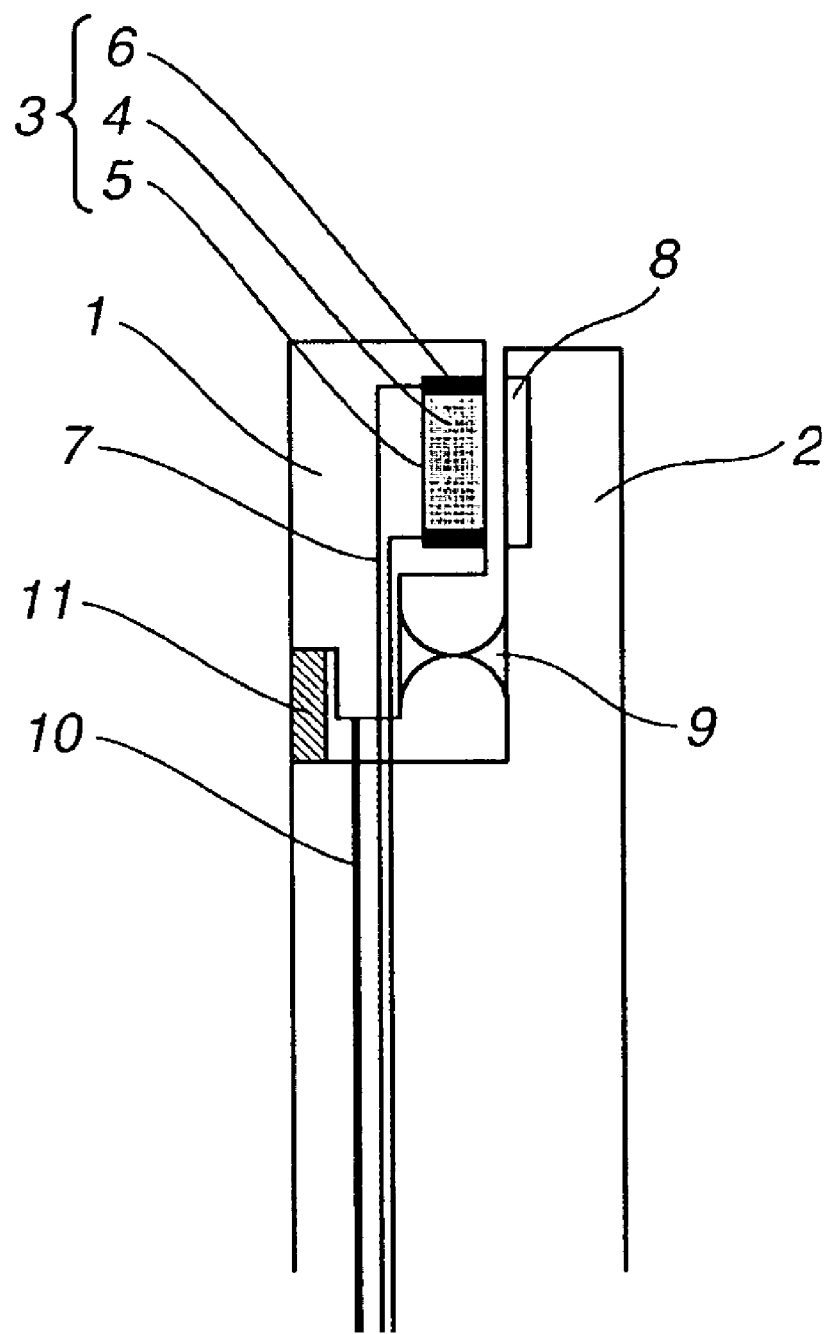
FIG. 1 is a cross-sectional view schematically illustrating a first embodiment of a holding structure according to the present invention.

A first embodiment of the present invention will be described with reference to FIG. 1 and FIGS. 2A to 2C.

In FIG. 1 and FIGS. 2A to 2C, reference numerals 1 and 2 designate fingers for holding an object, respectively. The finger 1 is movable, and can perform a closing or opening motion. The finger 2 is a stationary finger. At a tip portion of the movable finger 1, there is provided an elastic member 3 that is capable of changing its elasticity due to viscosity and the like. The elastic member 3 is comprised of an electrical viscous fluid 4, a container 5, such as a pouch, for containing the electrical viscous fluid 4 in a sealing manner, and electrodes 6 for changing the viscosity of the electrical viscous fluid 4. Reference numeral 7 designates a cable for applying a voltage to the electrode 6 from outside. An elastic member 8, such as rubber, is fixed to a tip portion of the stationary finger 2 such that the object can be readily held.

Further, reference numeral 9 designates an elastic hinge guide for establishing the closing and opening motion of the movable finger 1. Reference numeral 10 designates a shape memory wire formed of a shape memory alloy for carrying out the closing and opening motion of the movable finger 1. Reference numeral 11 designates a pre-biased spring for giving the movable finger 1 a force toward its closing direction. In the closing and opening mechanism for the movable finger 1, an arcuate motion is executed about the thinnest portion of the elastic hinge guide 9 (see FIG. 2A). The closing motion for bringing the movable finger 1 closer to the stationary finger 2 is carried out by the force of the pre-biased spring 11, while the opening motion of the movable finger 1 is performed when the shape memory wire 10 is contracted by a rise of its temperature to overcome the force of the pre-biased spring 11.

In the first embodiment, the shape memory wire 10 is comprised of two serially-connected wires (a first shape memory wire and a second shape memory wire). Two kinds of displacements (three kinds of displacements including an initial state) of the shape memory wire 10 occur at different temperatures. The first shape memory wire 10 is adapted to be largely extended or contracted, while the second shape memory wire is adapted to be a little extended or contracted. Although the shape memory wire 10 can be displaced by application of heat thereto, it is simpler to cause a current flow in the wire 10 and generate Joule's heat therein. In this embodiment, each of the above three kinds of displacements is selectively caused by no-current flow (OFF), a first-step current flow, or a second-step current flow in the wire 10.

In the first embodiment, for the purposes of reducing the size of the holding structure, the shape memory wire 10 and the pre-biased spring 11 constitute an actuator for achieving the closing and opening motion of the movable finger 1 and the elastic hinge guide 9 constitutes a guide for guiding the closing and opening motion. If the reduction in the size can be achieved, a cylinder using air pressure or electromagnetic force, a bellows-diaphragm, a solenoid, a voice-coil motor or the like can constitute the actuator for achieving the closing and opening motion, and a rolling or sliding guide using a small bearing or pin can constitute the guide.

The electrical viscous fluid 4 will be described. The electrical viscous fluid is a fluid that is capable of changing its viscosity according to the magnitude of an electric field externally applied thereto. Since this change is reversible, the viscosity can be externally controlled. Further, a response of that change is quite fast. With respect to a change in the viscosity of the electrical viscous fluid, it is said that positive and negative charges are moved by the application of a voltage to the fluid to generate polarization in each particle, and the particles are attracted to each other due to the polarization, thereby increasing the viscosity.

The electrical viscous fluid is generally an electrical viscous fluid made by mixing dispersion particles into an appropriate dispersion medium, but it can also be a pure single-phase electrical viscous fluid having a feature that the viscosity of the fluid itself changes. The change in viscosity of the electrical viscous fluid using dispersion particles is larger than the pure single-phase electrical viscous fluid. The dispersion particle is a dielectric fine solid particle, and there are, as typical dispersion particle, silica, alumina, silicic soda iron oxide, and starch. The dispersion medium is an electrical insulating medium, and there are, as typical dispersion media, silicone oil, petroleum ether, and kerosene. As the pure single-phase electrical viscous fluid, there exists a fluid made by bonding liquid crystal compound to flexible molecular chains such as silicone.

In the present invention, it is preferable to reduce the size of the holding structure by decreasing the amount of contraction of the elastic member 3 needed to obtain a holding force for holding objects having a variety of shapes and sizes (i.e., by designing the elastic member 3 such that a sufficient holding force can be obtained only by a small deformation of the elastic member 3. It is therefore desirable to use the electrical viscous fluid with dispersion particles, that is capable of largely changing its viscosity.

The container 5 for containing the electrical viscous fluid 4 in a sealing manner will be described. Necessary characteristics of the container 5 are, in addition to the sealing characteristic for the electrical viscous fluid, a compliance capable of changing its shape in compliance with the shape of an object without damaging fluidity and elasticity of the electrical viscous fluid 4, and an electrical insulating characteristic needed for application of a voltage to the electrical viscous fluid 4. As a material satisfying such electrical insulating characteristic and compliance, there are a watertight rubber, resin of a vinyl chloride group, polyethylene, polyurethane, and the like. Where it is preferable that the container 5 smoothly deforms in sufficient compliance with a change in viscosity of the electrical viscous fluid 4, a material having a relatively low modulus of elasticity, such as an elastomer, is used. Where excessive deformation is not preferable, a material having a relatively high modulus of elasticity, such as a synthetic resin film, is used.

The electrode 6 for applying a voltage to the electrical viscous fluid 4 can be comprised of a metal that is insulated excluding its electrode surface, or an electrode formed on a necessary portion of the container 5 of an insulating material by evaporation, chemical plating, deposition or the like of copper, gold, aluminum or the like.

Figures 2A, 2B, 2C:
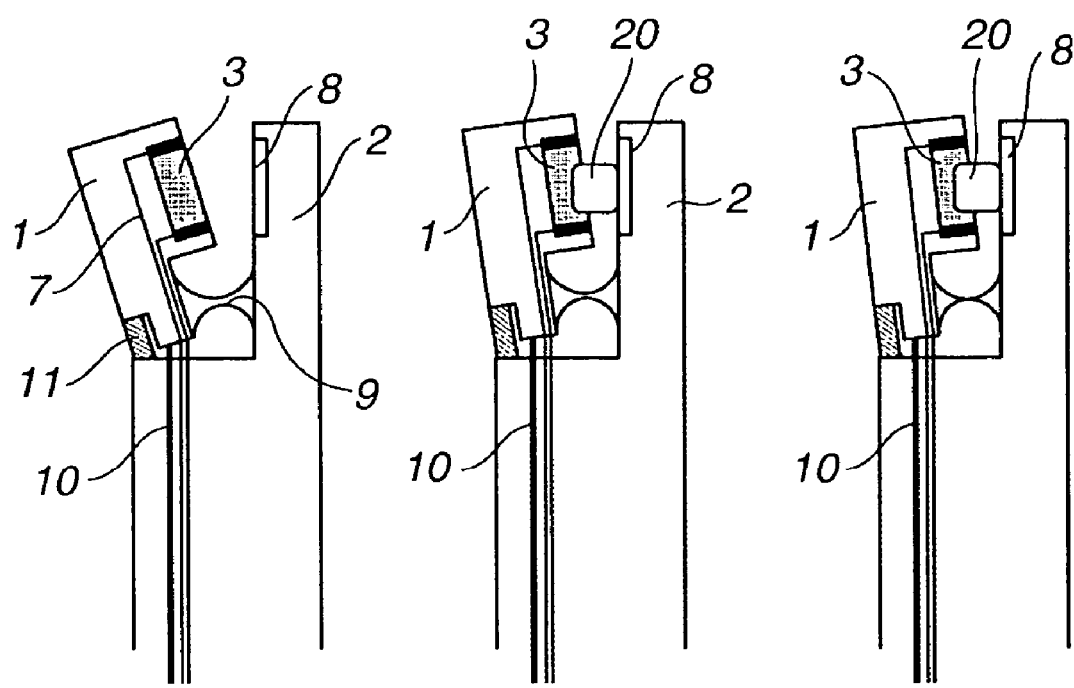
FIGS. 2A to 2C are cross-sectional views illustrating motions or operations of the first embodiment, respectively.

The closing and opening operation of the holding structure and the control of the electrical viscous fluid 4 of the first embodiment will now be described with reference to FIGS. 2A to 2C. FIG. 2A illustrates a state in which the shape memory wire 10 is heated to a relatively-high first-step temperature (for example, a relatively-large first-step current is caused to flow in the wire 10) such that the two kinds of shape memory wires can be contracted, and the movable finger 1 is hence opened. In this state, the holding structure is moved by a driving mechanism (not shown) to a place of an object 20 to be held. The temperature is then changed to a relatively-low second-step temperature (for example, a relatively-small second-step current is caused to flow in the wire 10) to control the shape memory wire 10 such that the first shape memory wire is extended while the second shape memory wire is contracted.

During the above-discussed operation, no voltage is applied to the electrode 6. Thus, as illustrated in FIG. 2B, the object 20 is held under a condition under which the electrical viscous fluid 4 is soft (i.e., in a small viscous state).

Then, a voltage is applied to the electrical viscous fluid 4 to increase the viscosity of the electrical viscous fluid 4 while the object 20 is held. Further, the temperature of the second shape memory wire, whose amount of expansion and contraction is small, is changed to its initial temperature (for example, current flowing in the wire 10 is switched off) such that the movable finger 1 can be moved a predetermined amount and can reach its most closed state. Thus, as illustrated in FIG. 2C, the object 20 is pushed into the elastic member 3 under a large viscous condition, and held by a sufficient force. Due to such a series of operations, it is possible to hold the object 20 by an approximately equal force even when the size of the object 20 changes.

In other words, the shape of the elastic member 3 is conformed to the shape of the object to be held 20, due to the fluid change of the electrical viscous fluid 4 in the state of FIG. 2B, and the viscosity of the electrical viscous fluid 4 is then increased. It is accordingly possible due to the amount of the second-step displacement of the shape memory wire 10 and the above enhanced viscosity to hold the object 20 by an approximately equal force even when the size of the object 20 changes. When the object 20 is to be released, the shape memory wire 10 is heated to the relatively-high first-step temperature to open the movable finger 1.

In the first embodiment, the electrical viscous fluid 4 is used, but it can be replaced by other functional fluid whose viscosity or elasticity can be changed by an external supply of energy such as electromagnetic energy, electromagnetic-wave (light) energy, and heat energy. The electrical viscous fluid 4 can be replaced by an electric-field response gel, or a magnetic fluid, for example. The electric-field response gel is a gel-like substance capable of changing its viscoelasticity by application of a voltage thereto. While the electrical viscous fluid is a substance obtained by dispersing particles into an insulating oil having a high fluidity, the electric-field response gel is a substance obtained by dispersing particles into an electrical insulating elastomer having a low fluidity with a high density. Modulus of elasticity, rather than viscosity, of the electric-field response gel is changed by application of a voltage thereto.

A second embodiment of the present invention will be described with reference to FIGS. 3A and 3B, and FIGS. 4A and 4B. The second embodiment is directed to a holding structure suitable for a case where sizes of objects to be held differ largely.

Figure 3A:
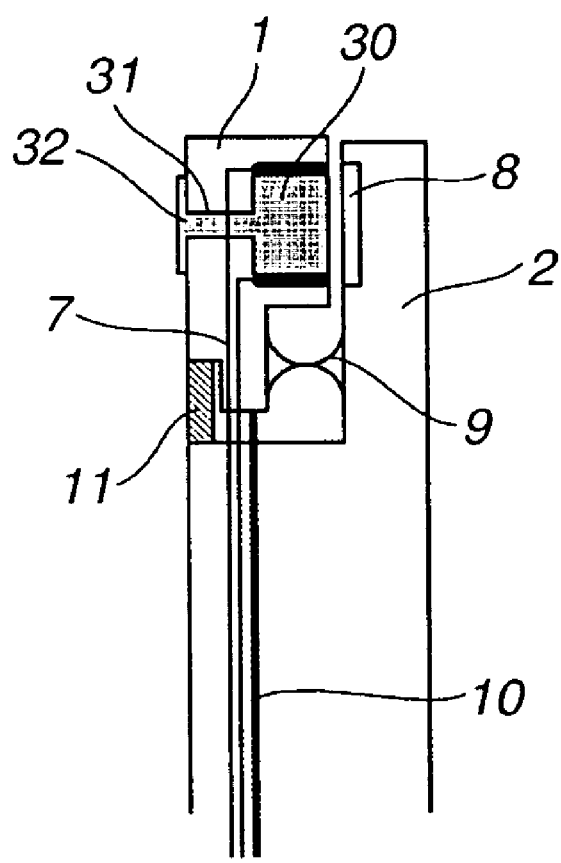
FIGS. 3A and 3B are cross-sectional views schematically illustrating a second embodiment of a holding structure according to the present invention, respectively.
Figure 3B:
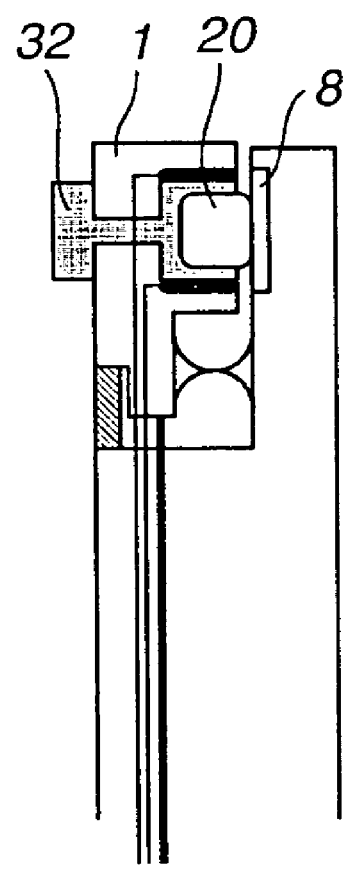

FIG. 3A illustrates the construction of the second embodiment. FIG. 3B illustrates a state in which the holding structure of the second embodiment holds an object 20. In FIGS. 3A and 3B, like reference numerals designate the same or similar constituent portions or elements illustrated in FIG. 1 and FIGS. 2A to 2C. In FIGS. 3A and 3B, reference numeral 30 designates an elastic member whose viscosity can be changed. Reference numeral 31 designates a flow path through which an electrical viscous fluid in the elastic member 30 can be moved. Reference numeral 32 designates a sub-tank for receiving an excess electrical viscous fluid. The elastic member 30 is connected to the sub-tank 32 through the flow path 31.

Since the sub-tank 32 is provided, an excess electrical viscous fluid flows into the sub-tank 32 as illustrated in FIG. 3B when a relatively large object 20 is held by the holding structure. The elastic member 30 can be thus approximately conform to the shape of the held object 20. The electrical viscous fluid in the sub-tank 32 needs to be moved to the elastic member 30 before the object is held. This movement is executed as follows. Application of a voltage to the electrical viscous fluid is stopped to being the electrical viscous fluid into a fluid condition, and the holding structure is moved by a manipulator moving mechanism (not shown) to apply a force to the sub-tank 32 by pressing it to a certain flat place. The elastic member 30 is thus filled with the electrical viscous fluid. The second embodiment is the same as the first embodiment with respect to the other points.

FIGS. 4A and 4B illustrate a modification of the second embodiment. In this modification, the holding structure is provided with a reference wall 40 for the sub-tank 32 such that the elastic member 30 can be filled with the electrical viscous fluid when the movable finger 1 is opened.

In the second embodiment, no electrode is provided at the fluid path 31, but an electrode can be mounted to the fluid path 31. In the event that a voltage higher than that applied to the elastic member 30 is applied to such an electrode, the electrical viscous fluid cannot be more smoothly moved to the sub-tank 32 in the holding structure in a holding state. It is accordingly possible to further stabilize a holding force for holding the object 20.

As discussed in the foregoing, according to the present invention, an elastic member, whose elasticity due to viscosity and the like is capable of being externally controlled, is provided at a portion of a finger for contact with an object in a holding structure, such as a manipulator, such that even small objects having a variety of shapes and different sizes can be accurately and certainly held. Further, the holding structure can be relatively readily reduced in its size and simplified in its mechanism. Thus, a variety of objects or workpieces can be effectively handled, and it is hence possible to cope with further increase in variety and further decrease in size of assemblage components and so forth.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. A structure for holding an object, comprising:
 a first finger including a first object contact portion;
 a second finger including a second object contact portion;
 a guide for operably connecting the first finger and the second finger and allowing the second finger to move relative to the first finger; and
 a moving mechanism for moving the second finger between an open and closed position, wherein
 at least one of the first and second object contact portions comprises an elastic member including a container filled with a viscous substance capable of changing its viscosity by application of an external supply of energy, wherein the viscous substance is one of electrical viscous fluid or electric field response gel or magnetic fluid.

2. The structure for holding an object according to claim 1, wherein the guide is an elastic hinge guide.

3. The structure for holding an object according to claim 1, wherein the moving mechanism includes a spring and a memory wire.

4. The structure for holding an object according to claim 1, wherein the container includes a sub-tank and a flow path.

5. A structure for holding an object, comprising:
 a first finger including a first object contact portion;
 a second finger including a second object contact portion;
 guide means for operably connecting the first finger and the second finger and allowing the second finger to move relative to the first finger; and
 moving means for moving the second finger between an open and closed position, wherein
 at least one of the first and second object contact portions comprise an elastic member including a container filled with a viscous substance capable of changing its viscosity by application of an external supply of energy, wherein the viscous substance is one of electrical viscous fluid or electric field response gel or magnetic fluid.

6. The structure for holding an object according to claim 5, wherein the guide means is an elastic hinge guide.

7. The structure for holding an object according to claim 5, wherein the moving means includes a spring and a memory wire.

8. The structure for holding an object according to claim 5, wherein the container includes a sub-tank and a flow path.

* * * * *